United States Patent [19]

Iwasaki

[11] Patent Number: 5,749,002
[45] Date of Patent: May 5, 1998

[54] CHROMATIC BALANCER FOR FLASH CAMERAS

[75] Inventor: Hiroyuki Iwasaki, Yokohama, Japan

[73] Assignee: Nikon Corporation, Tokyo, Japan

[21] Appl. No.: 807,272

[22] Filed: Feb. 28, 1997

[30] Foreign Application Priority Data

Mar. 1, 1996 [JP] Japan .................................. 8-044845

[51] Int. Cl.$^6$ .............................. G03B 7/00; G03B 15/05
[52] U.S. Cl. ............................................ 396/161; 396/225
[58] Field of Search ................................ 396/225, 155, 396/159, 161; 348/224, 370, 371

[56] References Cited

U.S. PATENT DOCUMENTS 4,989,093  1/1991  Kaneko .

FOREIGN PATENT DOCUMENTS 4-167771  6/1992  Japan .
7-23774   5/1995  Japan .

*Primary Examiner*—W. B. Perkey
*Attorney, Agent, or Firm*—Oliff & Berridge PLC

[57] ABSTRACT

A chromatic balancer determines an optimal chromatic balance between strobe illumination and light illumination during balance synchro photography. A photometric detector measures the amount of light from one or more regions in the scene to be photographed. A chromatic balance calculator determines the chromatic balance of the photograph scene. A background exposure correction value calculator determines a background light exposure correction value. A flash level correction value calculator determines a flash level correction value.

27 Claims, 15 Drawing Sheets

CHROMATIC BALANCER FOR FLASH CAMERAS

BACKGROUND OF THE INVENTION

1. Field of Invention

This invention relates to flash cameras. More which controls the balance between the amount of exposure from flash illumination during flash photography and the amount of exposure from background light.

2. Description of Related Art

One conventional flash camera is described in JP 7-23774. This conventional camera determines whether an object being photographed is illuminated by fluorescent light. If the camera determines that the object is illuminated by fluorescent light, the camera attempts to reduce the green chromatic fog caused by the fluorescent light. The camera accomplishes this by switching to a "strobe flash shooting mode" during which the camera illuminates the object with strobe light during exposure.

This conventional camera effectively determines that illumination is provided by fluorescent light, and reduces the chromatic fog caused by the fluorescent light by switching to the strobe flash photography mode. However, the camera can also use the strobe flash photography mode in the absence of fluorescent light. Therefore, the possibility exists that the surrounding illumination of the photograph setting will not be captured in the resulting photograph.

For example, when a person is photographed with the setting sun in the background, a camera should preferably use a "balance synchro photography" mode. In the balance synchro photography mode, the camera adjusts the backlight exposure level so that the sunset can be photographed. The camera adjusts the strobe illumination exposure level at the same time. However, if the camera uses the balance synchro photography mode under fluorescent light illumination, the camera cannot correct for the chromatic fog caused by the fluorescent light. Thus, the person's face takes an unhealthy cast. If the camera adjusts the backlight exposure control so that no chromatic fog affects the person's face under fluorescent light illumination, the sunset will not show up in the photograph due to extreme underexposure of the background.

JP 4-167771 discloses a camera which detects the brightness and chromatic levels of the subject, determines the photographic condition of the subject and corrects the photometric control signals based on this determination. When back lighting conditions, or light conditions exceeding normal light conditions, exist, correction signals are output so that the values of the brightness signals, i.e. the signals representing the subject's skin color, take appropriate exposure values. This allows the subject's features, e.g., the subject's face, to be exposed properly.

However, because there is no strobe flash illumination, the camera cannot correct for the chromatic fog from the light source illuminating the subject's face.

SUMMARY OF THE INVENTION

This invention provides a camera having a chromatic balancer capable of providing an optimal chromatic balance between strobe illumination and light illumination during balance synchro photography.

The camera of this invention has a chromatic balancer, including a photometric detector, a chromatic balance calculator, a background exposure correction value calculator and a flash level correction value calculator.

The photometric detector measures the amount of light from one or more of a plurality of regions in the scene to be photographed. The chromatic balance calculator determines the chromatic balance of the photograph scene. The background exposure correction value calculator calculates a background light exposure correction value. The flash level correction value calculator generates a flash level correction value.

In contrast to the conventional flash cameras discussed above, the camera having the chromatic balancer of this invention detects the chromatic levels of the background light and object and uses the detected chromatic level to correct the background light exposure and the flash illumination level. This achieves an optimum chromatic balance between flash illumination and background light for the scene being photographed.

Accordingly, the camera having the chromatic balancer of this invention can correct for background light exposure effects, such as chromatic fog, while achieving proper exposure of the object by adjusting the flash illumination level.

These and other features and advantages of the invention will be apparent to those skilled in the art from the following detailed description of preferred embodiments, taken together with the accompanying drawings, in which:

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
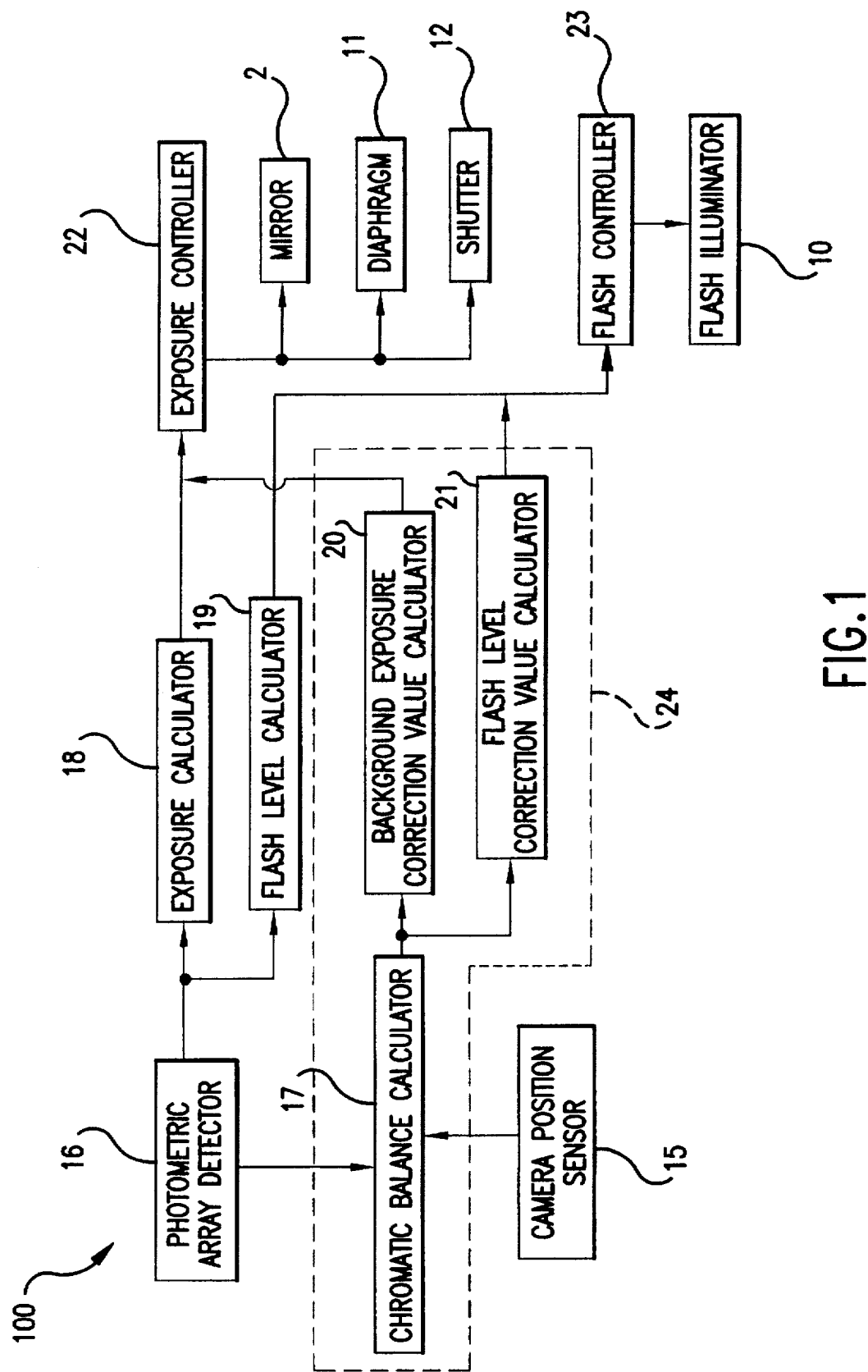
FIG. 1 is a block diagram of a camera having the chromatic balancer of this invention.

As shown in FIG. 1, a camera 100 includes a photometric detector 16. The photometric detector 16 measures the amount of light from one or more of a plurality of regions in the scene to be photographed. This photometric data is sent to an exposure calculator 18 and the flash level calculator 19.

The exposure calculator 18 calculates a background light exposure value, while the flash level calculator 19 calculates a flash illumination level value. The methods these elements use to calculate these values will be described in more detail below. The output of the exposure calculator 18 is sent to an exposure controller 22. The output of the flash level calculator 19 is sent to a flash controller 23.

The photometric detector 16 also measures the blue (B), green (G) and red (R) light levels from the scene to be photographed. This spectral information is sent to a chromatic balance calculator 17.

The chromatic balance calculator 17 determines the chromatic balance of the scene to be photographed using part or all of the photometric data from the photometric detector 16. This determination is based, in part, on the position, or orientation, of the camera. A preferred camera position or orientation sensor for determining whether the camera is in a horizontal, i.e., landscape, or vertical, i.e., portrait, position, will be described in more detail below. The output from the chromatic balance calculator 17 is sent to a background exposure correction value calculator 20 and a flash level correction value calculator 21.

The background exposure correction value calculator 20 calculates a background exposure correction value. The output of the background exposure correction value calculator 20 is sent to the exposure controller 22. The output of the flash level correction value calculator 21 is sent to the flash controller 23. The flash level correction value calculator 21 determines flash level correction values. The methods used by these devices will be described in more detail below. In addition, it should be appreciated that, although the chromatic balance calculator 17, background exposure correction value calculator 20 and flash level correction value calculator 21 are shown as separate devices, they may be implemented by a single device, as illustrated by the dashed block 24.

The exposure controller 22 controls the background light exposure value based on the outputs of the exposure calculator 18 and the background exposure correction value calculator 20. The flash controller 23 controls the amount of flash illumination based on the outputs of the flash level calculator 19 and the flash level correction value calculator 21.

Figure 2:
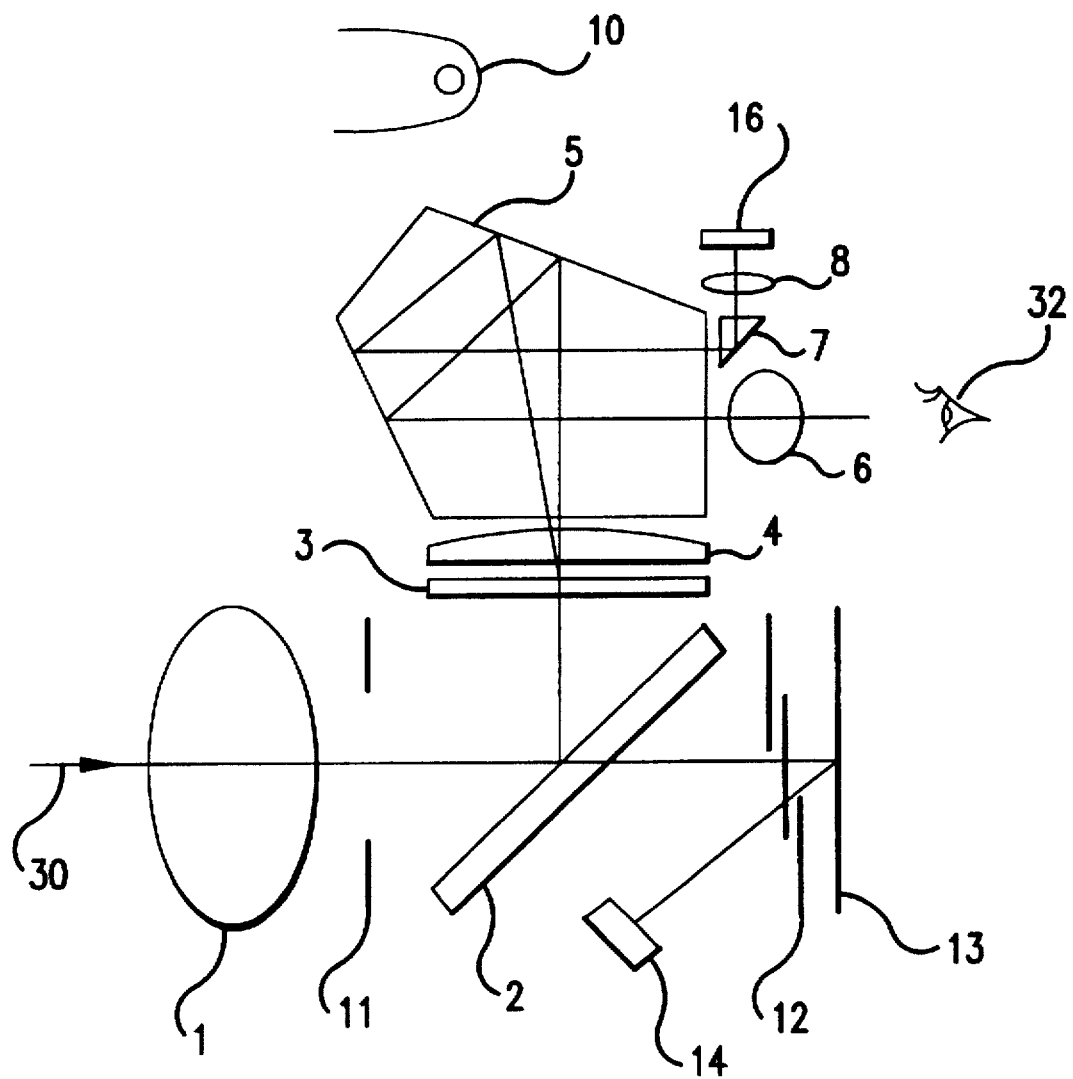
FIG. 2 is a schematic diagram of a camera having the chromatic balancer of this invention.

As shown in FIG. 2, the light rays 30 reflected from the object to be photographed pass through a photographic lens 1 and are directed to a quick return mirror 2. In a lowered position, the quick return half mirror 2 reflects the light rays 30 to a diffusion screen 3 and a condenser lens 4. In a raised position, the quick return mirror 2 passes the light rays 30 to an image recording medium 13. The condenser lens 4 separates the light rays 30 into two portions. A first portion is directed by a pentaprism 5 through an eyepiece lens 6 to an eye 32 of the photographer. A second portion of the light rays 30 is directed to a photometric prism 7, which redirects the second portion through a photometric lens 8 onto the photometric detector 16. The photometric detector 16 is preferably a two-dimensional array detector.

When a release button (not shown) is fully depressed, the quick return mirror 2 is raised to the raised position. In the raised position, the quick release mirror 2 allows the light rays 30 to pass to a shutter 12. The shutter 12 is then opened to expose the image recording medium 13, such as film or a CCD array. A flash illuminating unit 10 fires simultaneously with the film 13 being exposed. Part of the light from the flash illuminating unit 10 is reflected from the object as the light rays 30. When the film 13 is exposed, a portion of the light rays 30 is reflected by the film 13 onto a flash element 14.

The exposure controller 22 determines the background light exposure based on the outputs of the exposure calculator 18 and background exposure correction value calculator 20. When the camera release button is fully depressed, the quick return mirror 2 is raised. In accordance with the background exposure values, which are based on the outputs of the exposure calculator 18 and the background exposure correction value calculator 20, the diaphragm 11 and the shutter 12 are controlled to expose the film 13.

The flash controller 23 controls the amount of flash illumination based on the outputs of the flash level calculator 19 and the flash level correction value calculator 21. Specifically, the flash controller 23, when receiving flash illumination signals caused by fully depressing the release button, corrects the illumination values sent to flash illuminating unit 10 based on the outputs of the flash level calculator 19 and flash level correction value calculator 21.

Figure 3A:
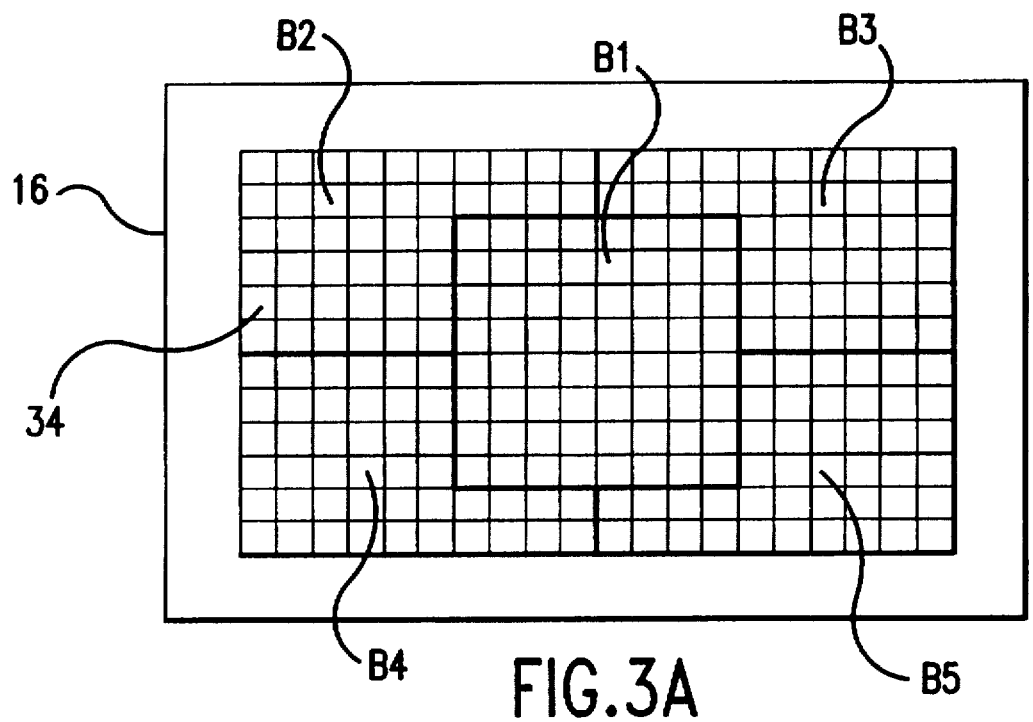
FIG. 3A is a schematic diagram of a preferred embodiment of a photometric array detector of this invention.
Figure 3B:
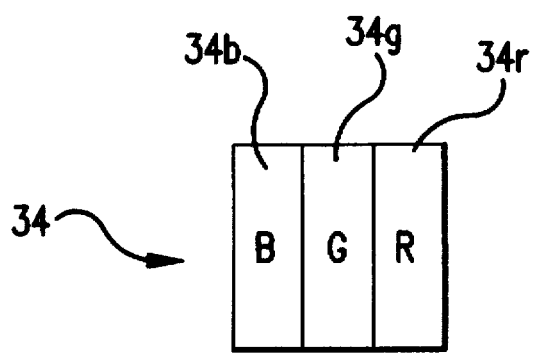
FIG. 3B is a schematic diagram of the blue, green and red detector portions that make up the array detector of FIG. 3A.
Figure 4:
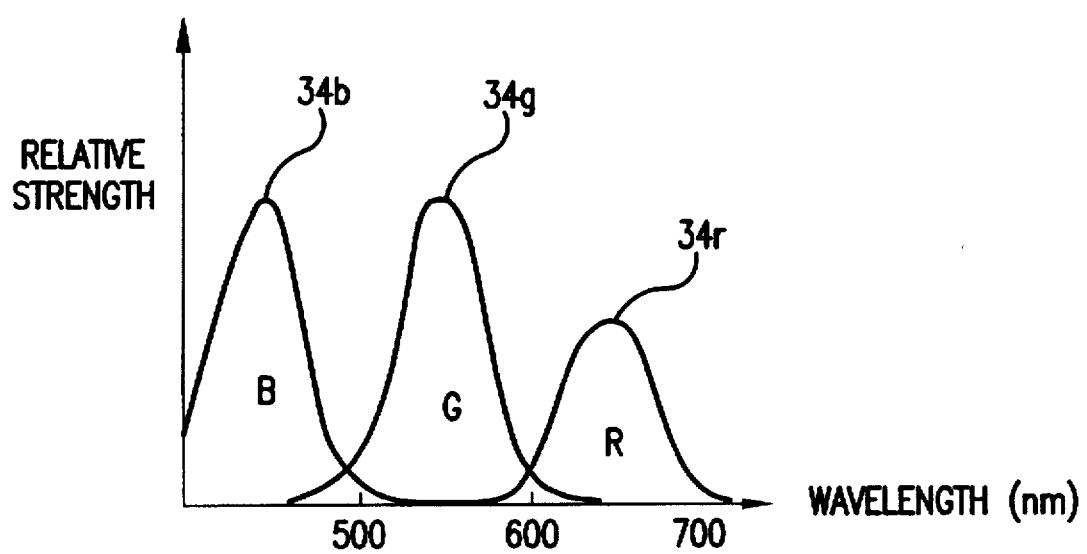
FIG. 4 illustrates the spectral sensitivity of the photometric array detector of FIG. 3A.

FIG. 3A shows a preferred configuration for the photometric detector 16. The photometric detector 16 is preferably an accumulation-type sensor, such as a CCD array detector. The photometric detector 16 preferably includes 240 detector regions 34 arranged in a 12×20 array, as illustrated in FIG. 3A. The photometric detector 16 measures the amount of light incident on each of the 240 regions. Each detector region 34 contains a blue (B) portion 34$b$, a green (G) portion 34$g$ and a red (R) portion 34$r$, as illustrated in FIG. 3B. The peak spectral sensitivities of the blue, green and red portions 34$b$, 34$g$ and 34$r$ are in the blue, green and red regions of the visible light spectrum, respectively, as illustrated in FIG. 4. Accordingly, the photometric detector 16 separately measures the blue, green and red light levels in each of the 240 regions.

Figure 5:
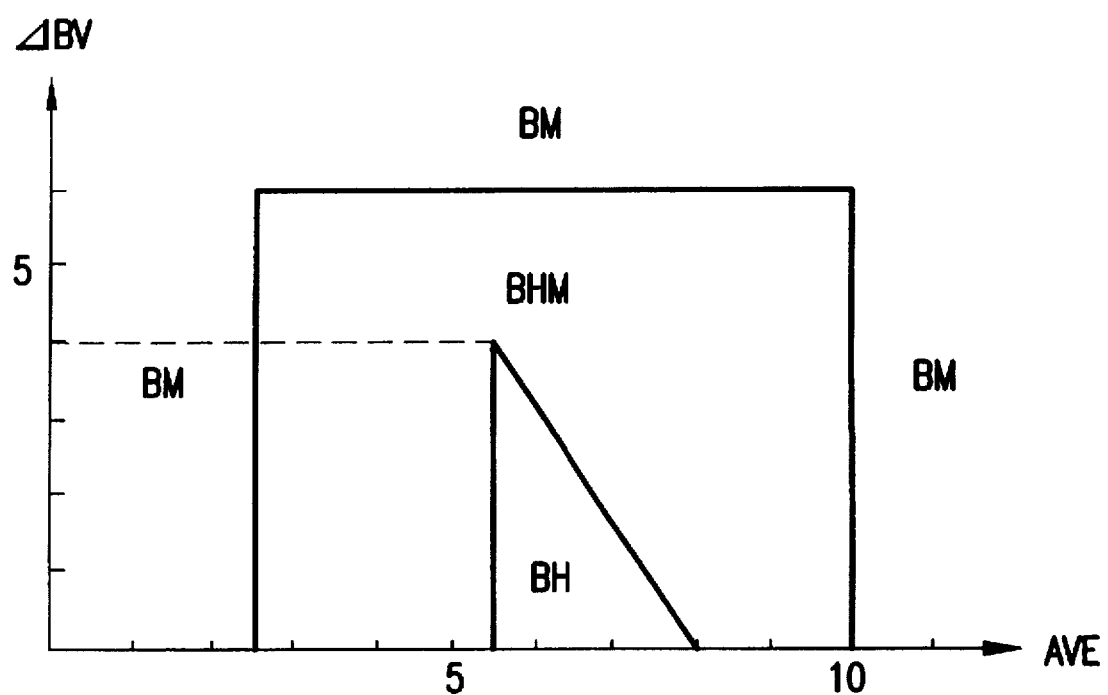
FIG. 5 illustrates a preferred set of control regimes for the background light exposure.

FIG. 5 shows a set of control regimes for determining the background light exposure value BVans. The value AVE on the horizontal axis and the value ΔBV on the vertical axis are determined from the control regimes of FIG. 5 by first categorizing the outputs from each of the photometric regions 34 into one of five detector areas. These areas are the areas D1, B2, B3, B4 and B5 of the array of the photo detector 16, as shown in FIG. 3A. AVE and ΔBV are determined as:

$$AVE = (BV1 + BV2 + BV3 + BV4 + BV5)/5 \tag{1}$$

$$\Delta BV = MAX\ (BV1 - BV5) - MIN\ (BV1 - BV5) \tag{2}$$

where:

BV1, BV2, BV3, BV4 and BV5 are the average detected green light values from the detector areas B1, B2, B3, B4 and D5, respectively;

MAX is a maximum value function; and function MIN is a minimum value function.

The background light exposure values BM, BHM and PH are determined as:

$$BM = (BV1 + BV2 + BV3 + BV4 + BV5)/5 \tag{3}$$

$$BMH = (BM + BX)/2 \tag{4}$$

$$BH = (2BX + BX2 + 1)/3 \tag{5}$$

where:

BX=MAX (BV1–BV5); and

BX2 is the next highest brightness value from the values BV1–BV5.

Figure 6:
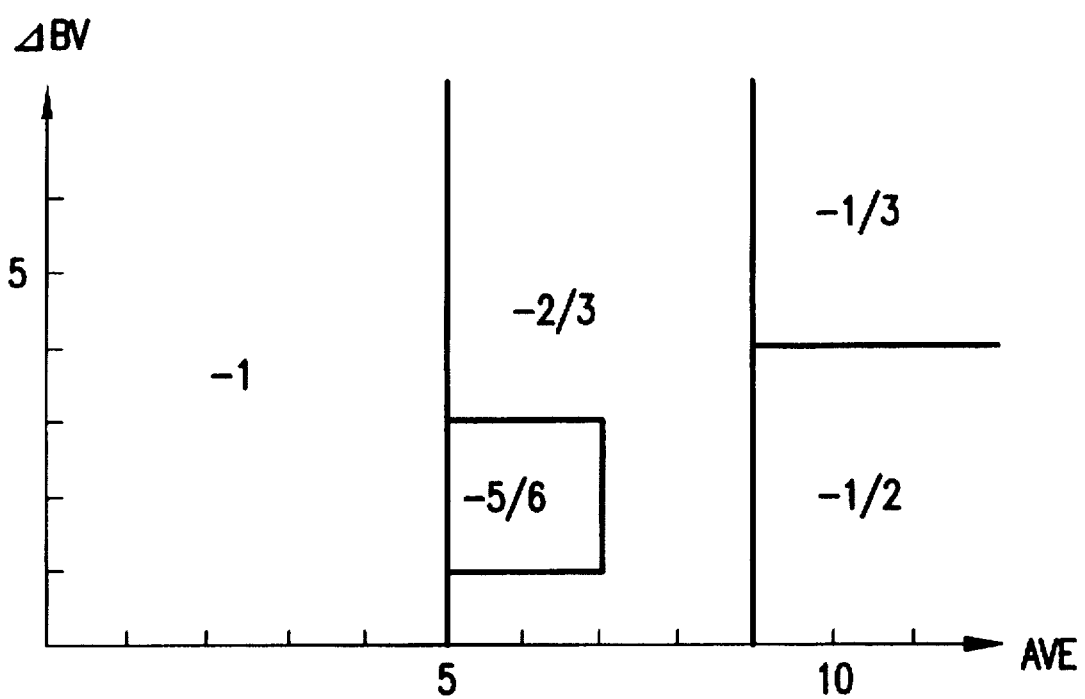
FIG. 6 illustrates a preferred set of control regimes for a flash illumination level.

FIG. 6 shows a set of control regimes for determining a flash illumination level TTL, in electron-volts (EV). The values shown in FIG. 6 represent the displacement from a standard strobe flash level, which is normally 0.1 lux-seconds (lx·s). A negative displacement is towards underexposure, while a positive displacement is towards overexposure.

Figure 7:
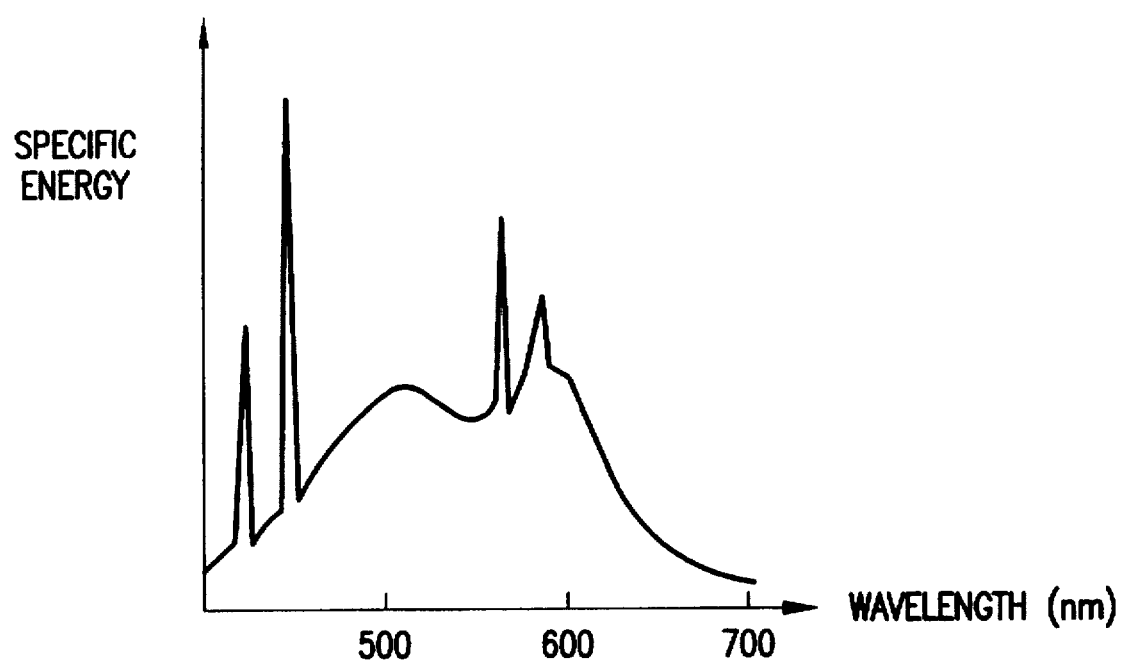
FIG. 7 illustrates a wavelength spectrum and specific energy of a typical fluorescent light.

FIG. 7 illustrates the visible light spectrum of a typical fluorescent light. As illustrated in FIG. 7, a plurality of wavelengths are projected as light energy, in what is referred to as a "bright-line" spectrum. Although the blue and red wavelengths have higher peaks, the green wavelength is the largest among blue, green and red light, when the light energy is looked at as a whole (i.e., as an average).

Figure 8:
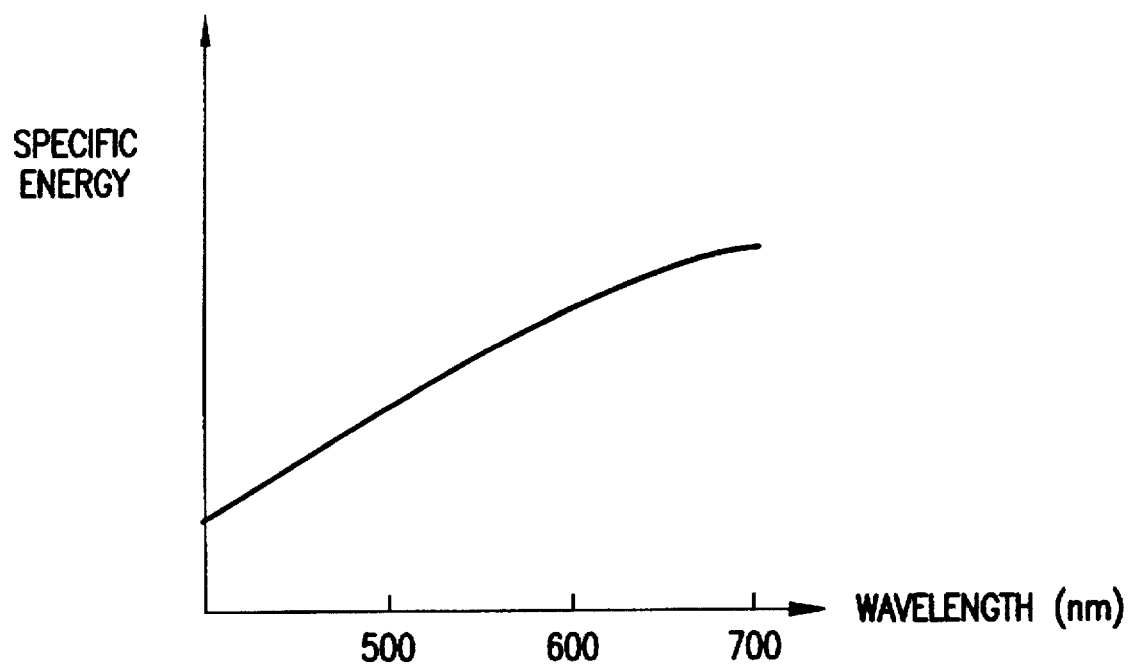
FIG. 8 illustrates a wavelength spectrum and specific energy of a typical "sunset" or "evening" scene.

FIG. 8 illustrates the visible light spectrum of sunlight during a typical sunset (i.e., during the evening glow). The chromatic temperature of the light seen in the evening glow is about 3,500° K. to 4,000° K., indicating extremely strong red components.

Figure 9:
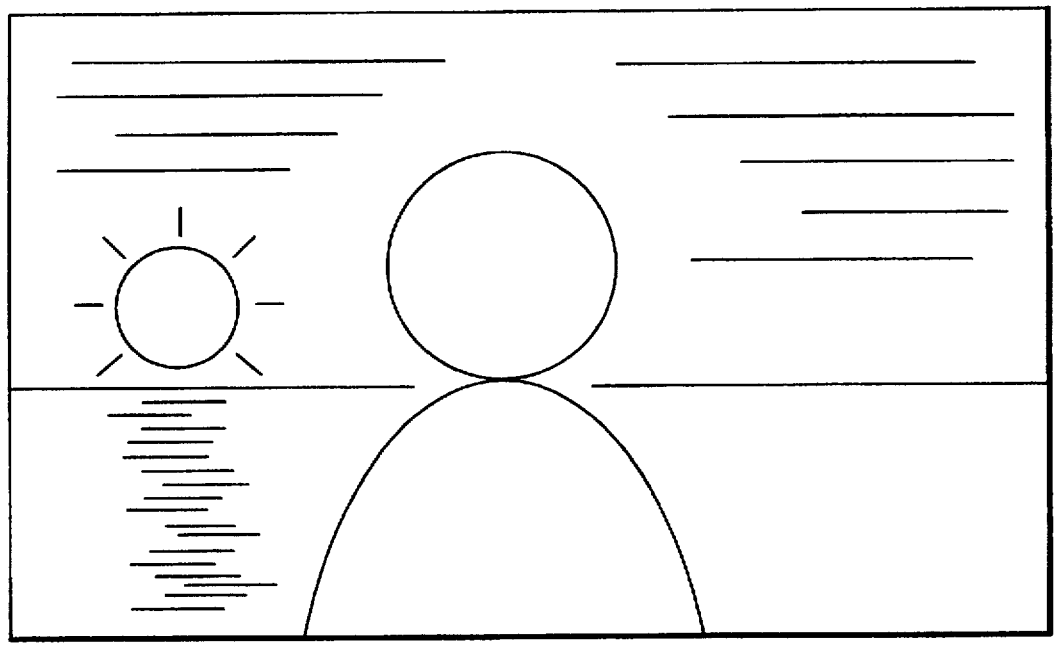
FIG. 9 shows a landscape oriented evening sunset scene.
Figure 10:
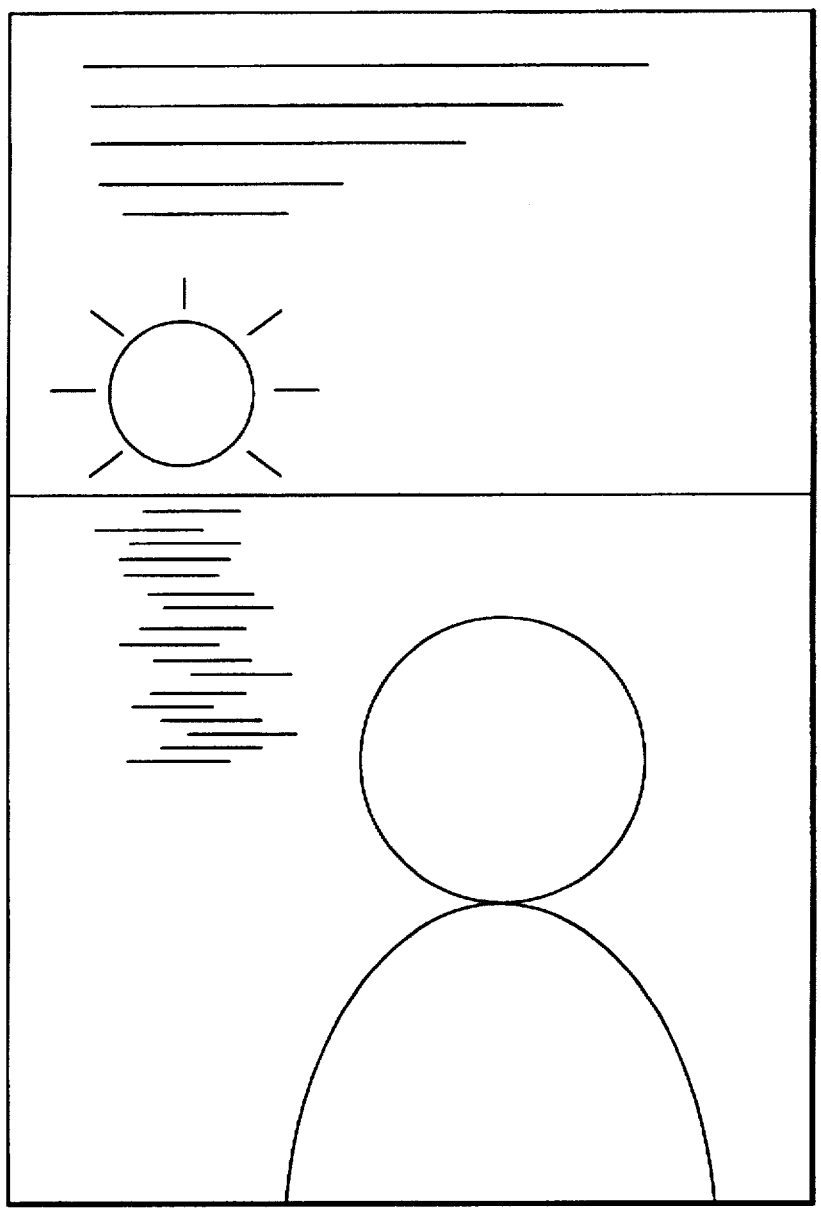
FIG. 10 shows a portrait oriented evening sunset scene.

FIG. 9 illustrates a first typical composition for a photograph taken during the evening. In FIG. 9, the camera is in the horizontal imaging position, or landscape mode. FIG. 10 illustrates a second typical composition for a photograph taken during the evening. In FIG. 10, the camera is in the vertical imaging position, or portrait mode. In these modes, when the photograph includes the evening sky, the sky will probably be included in the upper part of the photograph, particularly when the sunset is in the background.

This invention preferably uses a technique to determine whether the photograph is being taken during the evening with the sunset in the background. This technique involves checking the chromatic balance at the top of the scene being photographed. In the landscape mode, the chromatic balance of the detector areas B2 and B3 are checked. In the portrait mode, the chromatic balance of the detector areas B2 and B4, or B3 and B5 are checked, depending on which direction the camera is turned to take the portrait mode photograph.

Figure 11A:
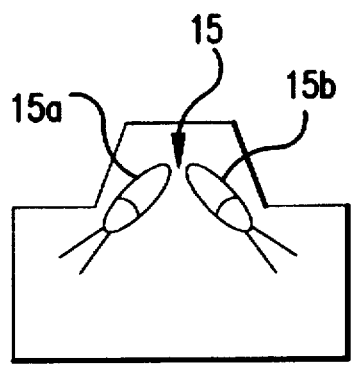
FIGS. 11A–11C are schematic diagrams of a camera position sensor used in a preferred embodiment of this invention.
Figure 11B:
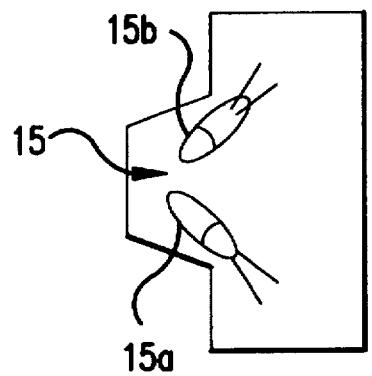
Figure 11C:
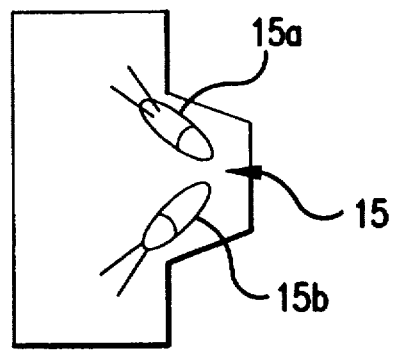

FIGS. 11A–C illustrate a preferred camera position sensor 15 used to determine the orientation of the camera 100. As illustrated in FIG. 11, the camera position sensor 15 includes two mercury switches 15a and 15b.

In FIG. 11A, the camera position is in a landscape orientation. In the landscape orientation, both of the mercury switches 15a and 15b are closed, i.e., conduct electric current. In FIG. 11B, the camera is in a first portrait orientation. In this first portrait orientation, the pentaprism 5 is on the right side from the viewpoint of the photographer and the detector areas B2 and B4 are at the top of the photograph. In the first portrait orientation, the mercury switch 15a is closed, while the mercury switch 15b is open, i.e., does not conduct electric current. In FIG. 11C, the camera position is in a second portrait orientation. In the second portrait orientation, the pentaprism 5 is on the left side from the viewpoint of the photographer and the detector areas B3 and B5 are at the top of the photograph. In the second portrait mode, the mercury switch 15b is closed, while the mercury switch 15a is open. The position of the camera 100 is determined by determining which of the mercury switches 15a and 15b, if either, is open. Once the camera position is determined, the chromatic balance of the appropriate detector areas are checked.

Figure 12:
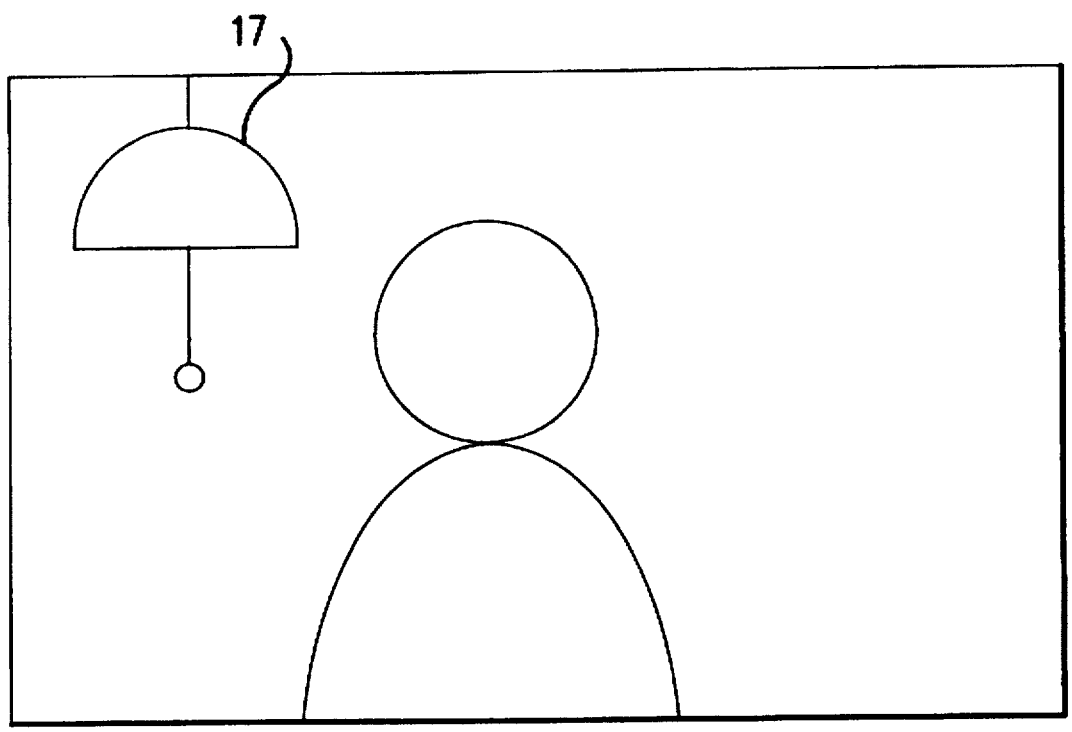
FIG. 12 shows an indoor scene.

FIG. 12 illustrates a typical composition for a photograph scene illuminated by a fluorescent light 17. Fluorescent illumination is often used in indoor photography. In this situation, the chromatic fog caused by fluorescent light will appear over the entire scene. Therefore, the average values of all the detector areas B1–B5 are preferably used when determining the chromatic balance.

A background exposure correction value BVs and a flash level correction value TTLs are calculated by:

$$BVs = aLog_2(RB) + bLog_2(GBR) \tag{6}$$

$$TTLs = cLog_2(RB) + dLog_2(GBR) \tag{7}$$

where:

RB is a ratio of the outputs from the red and blue portions 34r and 34b of the photometric region 34 of the photometric detector 16; and GBR is the ratio between outputs of the green, blue and red portions 34g, 34b and 34r.

The coefficients a, b, c and d in Equations 6 and 7 are used to calibrate the chromatic balance and correction values. The coefficients have default values of −1, 1, −1 and 1, respectively. However, these coefficients may be adjusted to calibrate the system.

Figure 13:
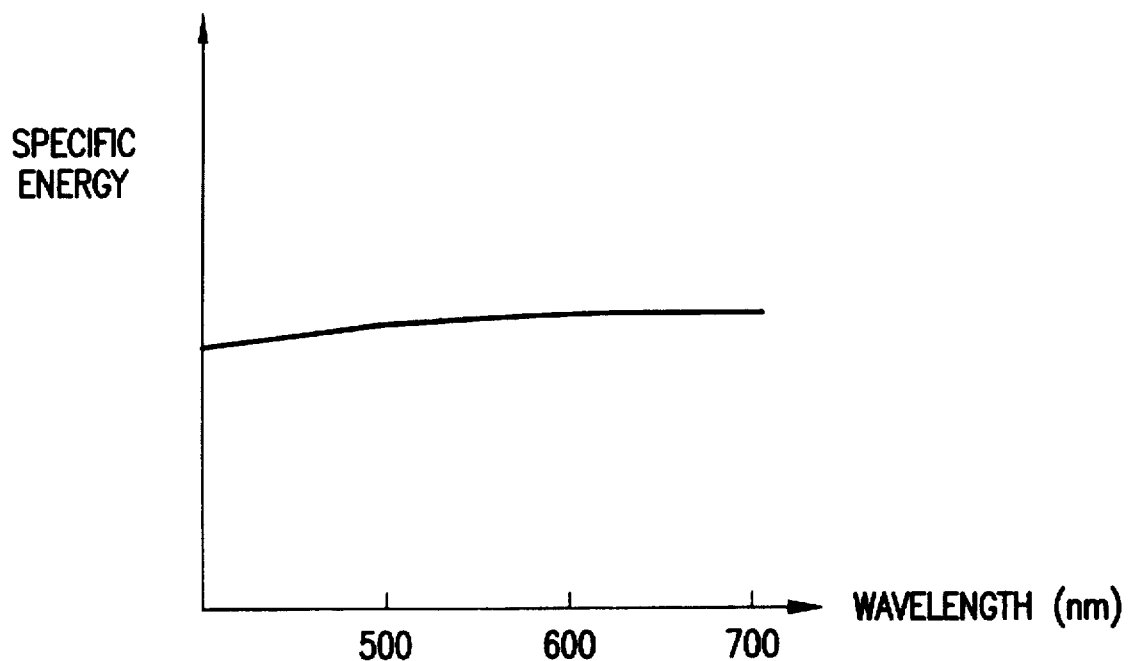
FIG. 13 illustrates a wavelength spectrum and specific energy of a standard light source.

Furthermore, RB is calculated by:

$$RB = RB'/RB0 \tag{8}$$

where:

RB0 is the ratio (R/B) between the outputs of the red and blue portions 34r and 34b when measuring the standard light source, which has a chromatic temperature of 5,500° K., as shown in the spectrum shown in FIG. 13; and RB' is a ratio (R/B) between the outputs of the red and blue portions 34r and 34b when the detector detects the photographic scene. Therefore, RB=2 if the R/B ratio in the photograph scene is twice as large as the R/B ratio of a standard light source. If the R/B ratio in the photograph scene is half as large as that of a standard light source, RB=0.5. The outputs of the red and blue portions 34r and 34b used in this calculation are the average values of the red and blue portions 34r and 34b of the detector regions 34 positioned in the detector areas (i.e., either B2 and B3, B2 and B4, or B3 and B5, depending on the camera orientation) positioned at the top of the photograph.

Similarly, GBR is calculated by:

$$GBR = GBR'/GBR0 \tag{9}$$

where:

GBR0 is the ratio (G/(BR)) between the outputs of the green, blue and red portions 34g, 34b and 34r when measuring the standard light source; and GBR' is the ratio (G/(BR)) between the outputs of the red and blue portions 34r and 34b when the detector 16 detects the photographic scene.

Therefore, GBR=2 if the ratio G/(BR) in the photographic scene is twice as large as the ratio for a standard light source, and GBR=0.5 if the ratio G/(BR) is half as large as the ratio for a standard light source. The outputs of the green, blue and red portions 34g, 34b and 34r used in the calculation are the average values of the outputs of the green, blue and red portions 34g, 34b and 34r, respectively, in the detector areas being used. As explained above, the detector areas being used will depend on the orientation of the camera.

When the coefficients are set to their default values, the background correction value BVs and the flash level correction value TTLs both become −1 when RB=2 and GBR= 1. RB will equal 2 and GBR will equal 1 when the output of the red portions 34r for the photograph is twice as large as that of the standard light source. Thus, the background exposure is corrected towards overexposure by one level, while the flash illumination level is corrected towards underexposure by one level from the default values determined for the standard light source. The background exposure correction compensates for the high red light content of the photograph scene, while the flash illumination level correction keeps the main object in the photograph scene from being overexposed. For example, in the sunset scenes illustrated in FIGS. 9 and 10, the background exposure correction will ensure that the background is appropriately exposed, while the flash illumination level correction ensures that the subject in the foreground is not overexposed due to the background exposure correction.

The values RB and GBR are equal to 1 and 2, respectively, when the output of the green portions 34g for the photograph scene is twice as large as that of the standard light source. In this case, BVs and TTLs both become 1. Thus, the background exposure is corrected towards underexposure by one level and the flash illumination level is corrected towards overexposure by one level from the default values. The photograph scene illustrated in FIG. 12, where the scene is illuminated by fluorescent light, is an example of this situation, where the green light content of the photograph scene is larger than that of a standard light source. In this situation, chromatic fog will appear in the photograph. Correcting the background light exposure towards underexposure eliminates the chromatic fog. At the same time, correction of the flash illumination level towards underexposure keeps the main object in the photograph scene appropriately exposed.

Similarly, when the blue light content of the photograph scene is larger than that of the standard light source, the background light exposure is corrected towards underexposure, while the flash illumination level is corrected towards overexposure. This corrects for chromatic fog when the chromatic temperature of the light source is higher than usual, such as a photograph scene that contains a shadow under a clear sky or that contains an overcast sky.

Figure 14:
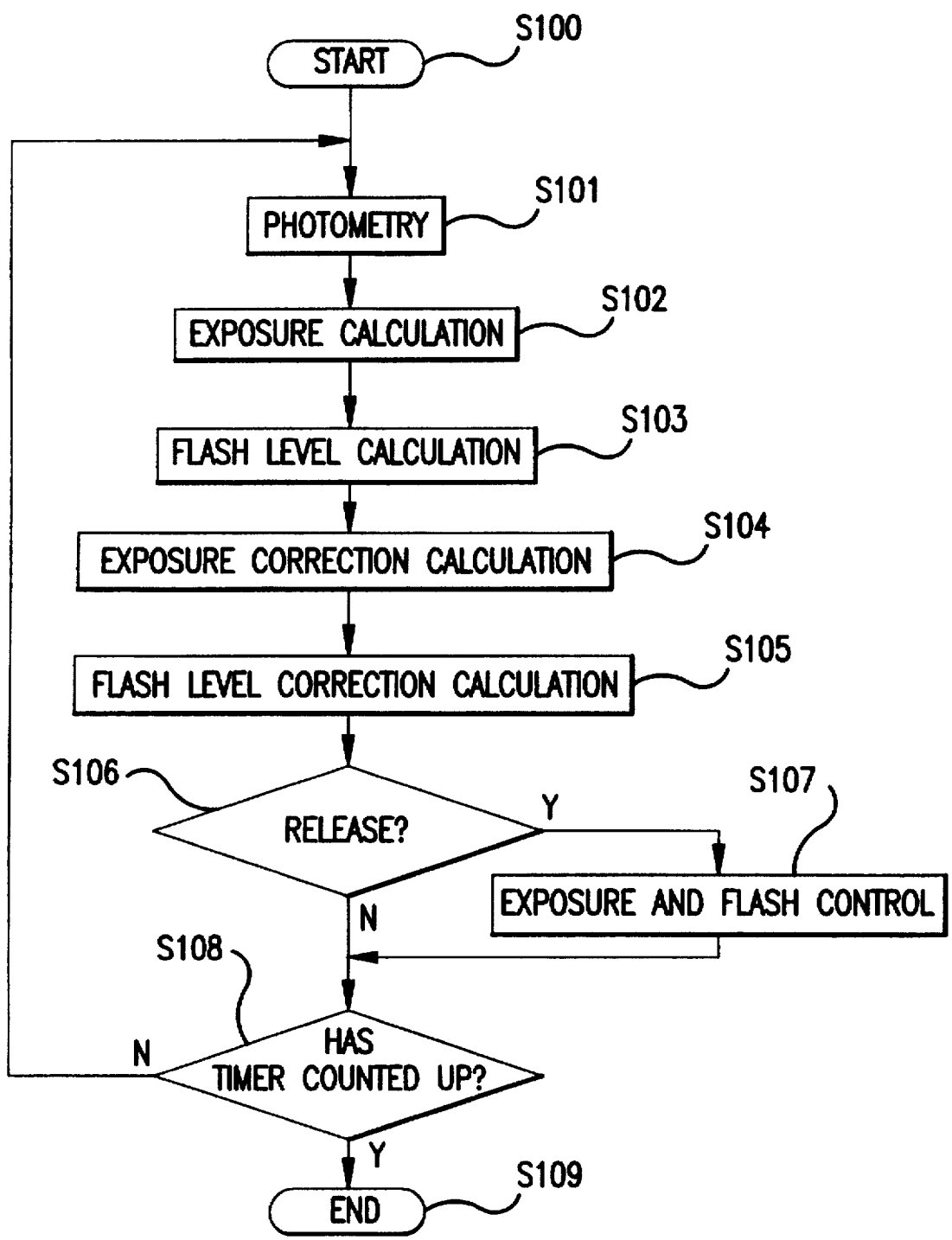
FIG. 14 is a flow chart of a preferred control routine for calculating the background light exposure and illumination level.

As shown in FIG. 14, when the camera release button (not shown) is half depressed, control begins by continuing from step S100 to step S101. In step S101, the photometric detector 16 determines a photometric value for the red, green and blue portions 34r, 34g and 34b.

Control then continues to step S102, where the background light exposure value BVans is calculated.

Next, in step S103, the flash illumination level TTL is calculated. Then, in step S104, the background light exposure correction value BVs is calculated. Finally, in step S105, the flash level correction value TTLs is calculated. Control then continues to step S106.

In step S106, the control system determines if the camera release button is fully depressed. If the camera release button is fully depressed, control continues to step S107. Otherwise, control passes directly to step S108.

In step S107, the control system controls the diaphragm 11 and the shutter 12 based on the values BVans and BVs determined by the exposure controller 22 to expose the film 13. At the same time, the control system controls the illumination level of the camera flash 10 based on the values TTL and TTLs calculated by the flash controller 23. Control then continues to step S108.

In step S108, the control system determines whether a half-depression timer (not shown) has timed out. If the half-depression timer has not timed out, control returns to step S101. However, if the half-depression timer has timed out, control continues to step S109, where the control routine halts.

Figure 15:
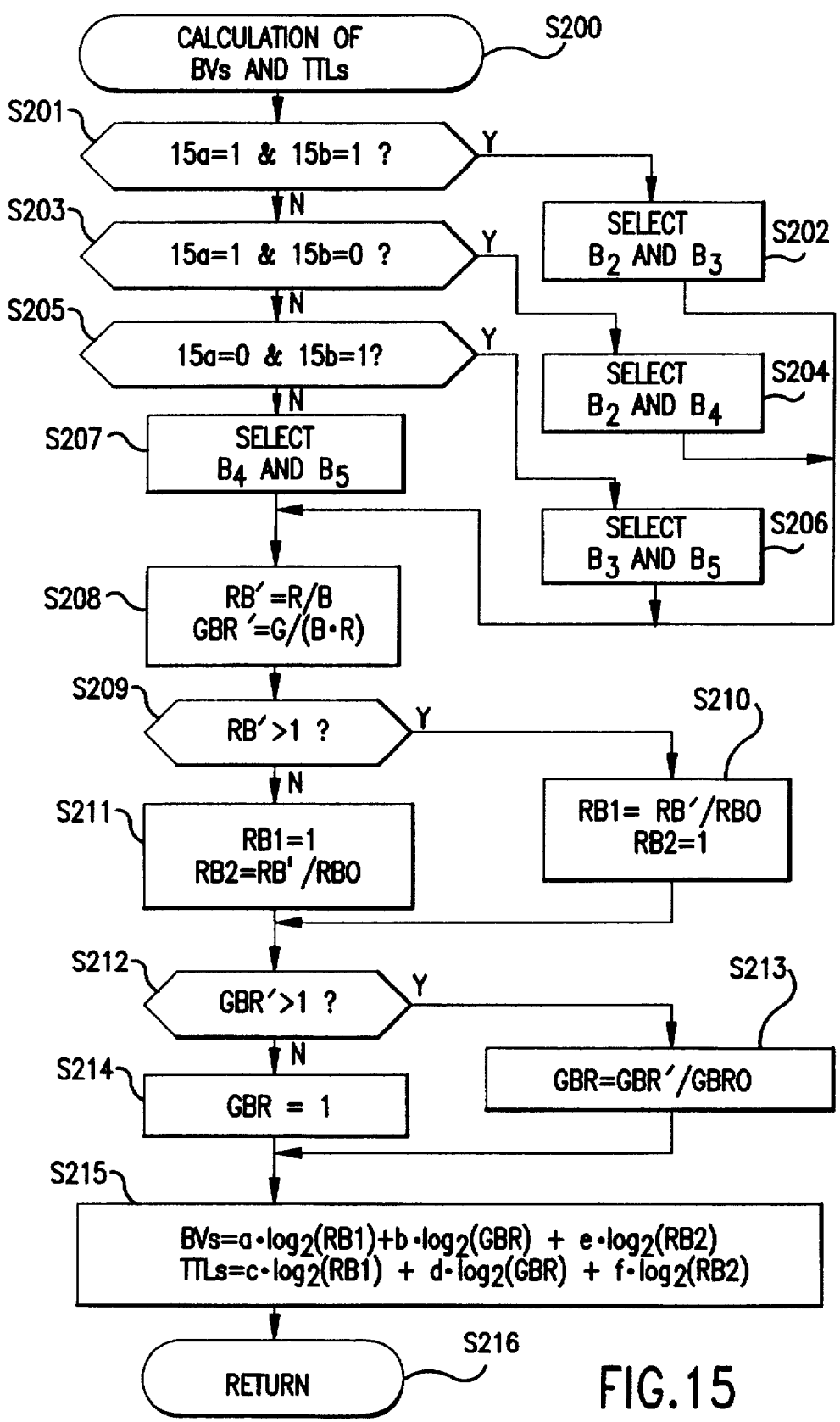
FIG. 15 is a flow chart of a preferred control routine for calculating the background light exposure correction value and the flash illumination level correction value.

FIG. 15 shows the control routine for calculating the values BVs and TTLs of steps S104 and S105. After beginning in step S200, control continues to step S201, where the control system determines whether the camera is in a horizontal position (i.e., the landscape orientation), based on the outputs from the mercury switches 15a and 15b. In steps S201, S203 and S205, a "1" indicates the switch is closed, and a "0" indicates the switch is open. If both switches are closed, control continues to step S202. Otherwise control jumps to step S203. In step S202, the detector areas B2 and B3 are selected. Control then jumps to step S208.

In step S203, the control system determines whether the camera is in the first portrait orientation. If the mercury switch 15a is closed and the mercury switch 15b is open, the camera is in the first portrait orientation, and control continues to step S204. Otherwise, control jumps to step S205. In step S204, the detector areas B2 and B4 are selected. Control then also jumps to step S208.

In step S205, the control system determines whether the camera is in the second portrait orientation. If the mercury switch 15a is open, while the mercury switch 15b is closed, the camera is in the second portrait orientation and control continues to step S206. Otherwise, control jumps to step S207. In step S206, the detector areas B3 and B5 are selected. Control then jumps to step S205.

In step S207, both switches are assumed to be open, indicating that the camera is upside down. Thus, in step S207, the detector areas B4 and B5 are selected. Control then continues to step S208.

In step S208, the control system calculates the values RB' and GBR'. Control then continues to step S209. In step S209, the control system determines whether the value RB' is greater than 1. This corresponds to red being stronger than blue in the photograph scene. If RB' is greater than 1 control continues to step S210. Otherwise, control jumps to step S211.

In step S210, RB1 and RB2 are set to (RB'/RB0) and 1, respectively. Control then jumps to step S212. In step S211, the values RB1 and RB2 are set to 1 and (RB'/RB0), respectively. Control then continues to step S212.

In step S212, the control system determines whether the value GBR' is greater than 1. This corresponds to green being stronger than either blue, red or both in the photograph scene. If GBR' is greater than 1, control continues to step S213. Otherwise, control jumps to step S214. In step S213, GBR is set to (GBR'/GBR0). Control then jumps to step S215. In step S214, GBR is set to 1. Control then continues to step S215.

In step S215, the control system calculates the variables BVs and TTLs as:

$$BV_s = aLog_2(RB1) + BLog_2(GBR) + eLog_2(RB2) \quad (10)$$

$$TTL_s = cLog_2(RB1) + dLog_2(GBR) + fLog_2(RB2) \quad (11)$$

Control then continues to step S216, which returns control to step S106.

The coefficients a, b, c, d, e and f of Equations (10) and (11) are used to calibrate the chromatic balance and correction values. They have default values −1, 1, −1, 1, −1 and 1, respectively. These coefficients can be adjusted to calibrate the system.

Using the default coefficients, BVs and TTLs are each −1 when RB1, GBR and RB are 2, 1 and 1, respectively. When RB1, GBR and RB2 are 1, 1 and 0.5, respectively, BVs and TTLs are both 1.

If red is the strongest color in the photograph scene, then RB1>1, RB2 is thus set to 1 in step S210. Therefore, in calculating BVs, because $Log_2$ (RB1)>1 and $Log_2$ (RB2)=1, only a$Log_2$(RB1), which is greater than 1, contributes to Equation (10). This is also true when calculating TTLs.

If green is the strongest color in the photograph scene, GBR is set to a value greater than 1 in step S213. Therefore, $Log_2$(GBR) is greater than 0. Thus, b$Log_2$(GBR) contributes to the calculation of BVs. Similarly, d$Log_2$(GBR) contributes to the calculation of TTLs.

If green is not the strongest color in the photograph scene, GBR is set to 1 at step S214.

Therefore, $Log_2$(GBR)=0. Thus, it does not contribute to the calculation of BVs or TTLs. If blue is the strongest color in the photograph scene, RB1=0, and 0<RB2<1. Therefore, because $Log_2$(RB1) is 0, and $Log_2$(RB2) is 0, only the terms with GBR contribute to the calculation of the correction variables BVs and TTLs.

It should also be appreciated that the elements 15 and 17–21 are preferably implemented using a programmed microprocessor or microcontroller and peripheral integrated circuit elements, an ASIC or other integrated circuit, a hardwired electronic or logic circuite such as a discrete element circuit, a programmable logic device such as a PLD, PLA or PAL, or the like. In general, any device on which a finite state machine capable of implementing the flowcharts shown in FIGS. 14 and 15 can be used to implement these elements, or any subset of these elements. That is, different devices can be used to individually implement these elements, or, as shown by element 24 in FIG. 1, a single device can be used to implement two or more of these elements.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A chromatic balancer, comprising:
   a photometric detector which measures light from at least one of a plurality of regions of a photograph scene and which generates corresponding photometric data;
   a chromatic balance calculator which determines a first chromatic balance and a second chromatic balance of the photograph scene based on the photometric data from the photometric detector;
   a background exposure correction value calculator which determines a background light exposure correction value based on the first chromatic balance determined by the chromatic balance calculator; and
   a flash level correction value calculator which generates a flash level correction value based on the second chromatic balance determined by the chromatic balance calculator.

2. The chromatic balancer of claim 1, wherein the chromatic balance calculator determines the chromatic balance of the photograph scene based on photometric data from a portion of the photograph scene.

3. The chromatic balancer of claim 1, wherein the chromatic balance calculator determines the chromatic balance of the photograph scene based on photometric data from the entire photograph scene.

4. The chromatic balancer of claim 1, wherein the photometric detector comprises a CCD array.

5. The chromatic balancer of claim 1, further comprising a position sensor for determining an orientation of the photometric detector.

6. The chromatic balancer of claim 1, wherein the photometric detector separately measures blue, green and red chromatic components in the photograph scene.

7. The chromatic balancer of claim 6, wherein the background exposure correction value determined by the background exposure correction value calculator adjusts a background light exposure towards underexposure when the green chromatic components in the photograph scene exceed a predetermined level.

8. The chromatic balancer of claim 6, wherein the flash level correction value determined by the flash level correction value calculator adjusts a flash illumination level towards a brighter level when the green chromatic components in the photograph scene exceed a predetermined level.

9. The chromatic balancer of claim 6, wherein the background exposure correction value adjusts a background light exposure towards overexposure when the red chromatic components in the photograph scene exceed a predetermined level.

10. The chromatic balancer of claim 6, wherein the flash level correction value adjusts a flash illumination level towards a dimmer level when the red chromatic components in the photograph scene exceed a predetermined level.

11. The chromatic balancer of claim 6, wherein the background exposure correction value adjusts a background light exposure towards underexposure when the blue chromatic components in the photograph scene exceed a predetermined level.

12. The chromatic balancer of claim 6, wherein the flash level correction value adjusts a flash illumination level towards a brighter level when the blue chromatic components in the photograph scene exceed a predetermined level.

13. The chromatic balancer of claim 1, wherein the chromatic balance calculator, background exposure correction value calculator and flash level correction value calculator comprise a single device.

14. A camera having a chromatic balance control, comprising:
   a flash illuminator which illuminates a photograph scene;
   an image recording medium which records the photograph scene;
   a photometric detector which measures light from at least one of a plurality of regions of the photograph scene and which generates corresponding photometric data;
   a chromatic balance calculator which determines a first chromatic balance and a second chromatic balance of the photograph scene based on the photometric data from the photometric detector;
   an exposure calculator which determines a background light exposure value based on the photometric data from the photometric detector;
   a background exposure correction value calculator which determines a background light exposure correction value based on the first chromatic balance determined by the chromatic balance calculator;
   an exposure controller which controls an exposure of the image recording medium based on the background light exposure correction value and the background light exposure value;

a flash level calculator which determines a flash illumination level based on the photometric data from the photometric detector;

a flash level correction value calculator which generates a flash level correction value based on the second chromatic balance determined by the chromatic balance calculator;

a flash controller which controls the flash illuminator based on the flash level correction value and flash illumination level.

15. The camera of claim 14, further comprising a shutter, and wherein the exposure controller controls the opening and closing of the shutter.

16. The camera of claim 14, wherein the chromatic balance calculator determines the chromatic balance of the photograph scene based on photometric data from a portion of the photograph scene.

17. The camera of claim 14, wherein the chromatic balance calculator determines the chromatic balance of the photograph scene based on photometric data from the entire photograph scene.

18. The camera of claim 14, wherein the photometric detector comprises a CCD array.

19. The camera of claim 14, further comprising a position sensor for determining an orientation of the camera.

20. The camera of claim 14, wherein the photometric detector separately measures blue, green and red chromatic components in the photograph scene.

21. The camera of claim 20, wherein the background exposure correction value determined by the background exposure correction value calculator adjusts a background light exposure towards underexposure when the green chromatic components in the photograph scene exceed a predetermined level.

22. The camera of claim 20, wherein the flash level correction value determined by the flash level correction value calculator adjusts a flash illumination level towards a brighter level when the green chromatic components in the photograph scene exceed a predetermined level.

23. The camera of claim 20, wherein the background exposure correction value adjusts a background light exposure towards overexposure when the red chromatic components in the photograph scene exceed a predetermined level.

24. The camera of claim 20, wherein the flash level correction value adjusts a flash illumination level towards a dimmer level when the red chromatic components in the photograph scene exceed a predetermined level.

25. The camera of claim 20, wherein the background exposure correction value adjusts a background light exposure towards underexposure when the blue chromatic components in the photograph scene exceed a predetermined level.

26. The camera of claim 20, wherein the flash level correction value adjusts a flash illumination level towards a brighter level when the blue chromatic components in the photograph scene exceed a predetermined level.

27. The camera of claim 14, wherein the chromatic balance calculator, background exposure correction value calculator and flash level correction value calculator comprise a single device.

* * * * *